(12) United States Patent
Gañán-Calvo (10) Patent No.: US 6,174,469 B1
(45) Date of Patent: Jan. 16, 2001

(54) DEVICE AND METHOD FOR CREATING DRY PARTICLES

(75) Inventor: Alfonso Gañán-Calvo, Seville (ES)

(73) Assignee: Universidad de Sevilla, Seville (ES)

( * ) Notice: Under 35 U.S.C. 154(b), the term of this patent shall be extended for 0 days.

(21) Appl. No.: 09/191,592

(22) Filed: Nov. 13, 1998

Related U.S. Application Data (63) Continuation-in-part of application No. 09/171,518, filed as application No. PCT/ES97/00034 on Feb. 18, 1997, now Pat. No. 6,119,953.

(30) Foreign Application Priority Data

May 13, 1996 (ES) .................................................. P 9601101

(51) Int. Cl.$^7$ ....................................................... B29B 9/00
(52) U.S. Cl. .................................................. 264/12; 264/7
(58) Field of Search ....................................... 264/7, 11, 12

(56) References Cited

U.S. PATENT DOCUMENTS

| | | |
|---|---|---|
| 3,700,170 | 10/1972 | Blanka et al. . |
| 3,804,255 | 4/1974 | Speece . |
| 4,141,055 | 2/1979 | Berry et al. . |
| 4,162,282 | 7/1979 | Fulwyler et al. . |
| 4,347,935 | 9/1982 | Merrill . |
| 4,352,789 | 10/1982 | Thiel . |
| 4,363,446 | 12/1982 | Jaeggle et al. . |
| 4,444,961 | 4/1984 | Timm . |
| 4,603,671 | 8/1986 | Yoshinaga et al. . |
| 4,617,898 | 10/1986 | Gayler . |
| 4,628,040 | 12/1986 | Green et al. . |
| 4,662,338 | 5/1987 | Itoh et al. . |
| 4,717,049 | 1/1988 | Green et al. . |
| 4,781,968 | 11/1988 | Kellerman . |
| 4,917,857 | 4/1990 | Jaeckel . |
| 5,020,498 | 6/1991 | Linder et al. . |
| 5,077,176 | 12/1991 | Baggio et al. . |

(List continued on next page.)

FOREIGN PATENT DOCUMENTS

| | | |
|---|---|---|
| 563807 | 7/1975 | (CH) . |
| 4031262A1 | 4/1992 | (DE) . |
| 0 249 186 A1 | 12/1987 | (EP) . |
| 0 250 164 A2 | 12/1987 | (EP) . |
| 2255291A | 11/1992 | (GB) . |
| 2099078A | 12/1992 | (GB) . |
| WO 90/05583 | 5/1990 | (WO) . |
| WO 91/18682 | 12/1991 | (WO) . |
| WO 94/11116 | 5/1994 | (WO) . |
| WO 94/23129 | 10/1994 | (WO) . |
| WO 95/23030 | 8/1995 | (WO) . |
| WO 96/16326 | 5/1996 | (WO) . |
| WO 97/43048 | 11/1997 | (WO) . |
| WO 97/44080 | 11/1997 | (WO) . |

*Primary Examiner*—Mary Lynn Theisen
(74) *Attorney, Agent, or Firm*—Karl Bozicevic; Bozicevic, Field & Francis LLP (57) ABSTRACT

Atomized particles within a desired size range (e.g., 1 micron to about 5 microns) are produced from two immiscible fluids, a first fluid source containing the formulation to be atomized, and a second fluid source which is contained in a pressure chamber surrounding at least the area where the first liquid is to be provided. Upon presentation of the first fluid source to the second, the second fluid is forced out of an opening positioned in front of the flow path of the formulation. The first and second fluids interact dynamically to form a stable capillary microjet, which in turn results in the formation of a focusing funnel at the opening. Formulation passing through this a focusing funnel will atomize upon exiting the opening of the pressurized chamber without physically contacting the perimeter of the opening.

11 Claims, 4 Drawing Sheets

U.S. PATENT DOCUMENTS

| | | |
|---|---|---|
| 5,087,292 | 2/1992 | Garrido . |
| 5,174,247 | 12/1992 | Tosa et al. . |
| 5,180,465 | 1/1993 | Seki et al. . |
| 5,194,915 | 3/1993 | Gilby . |
| 5,230,850 | 7/1993 | Lewis . |
| 5,364,632 | 11/1994 | Benita et al. . |
| 5,364,838 | 11/1994 | Rubsamen . |
| 5,372,867 | 12/1994 | Hasegawa et al. . |
| 5,397,001 | 3/1995 | Yoon et al. . |
| 5,404,871 | 4/1995 | Goodman et al. . |
| 5,458,292 | 10/1995 | Hapeman . |
| 5,522,385 | 6/1996 | Llyod et al. . |
| 5,554,646 | 9/1996 | Cook et al. . |
| 5,597,491 | 1/1997 | Winkler . |
| 5,697,341 | 12/1997 | Ausman et al. . |
| 5,740,794 | 4/1998 | Smith et al. . |
| 5,775,320 | 7/1998 | Patton et al. . |

DEVICE AND METHOD FOR CREATING DRY PARTICLES

CROSS-REFERENCES

This application is a continuation-in-part of U.S. application Ser. No. 09/171,518, filed Oct. 20, 1998, now U.S. Pat. No. 6,119,953, which application is incorporated herein by reference and to which application is claimed priority under 35 U.S.C. § 120. Further, the application Ser. No. 09/171,518 is the National Phase filing of PCT Application No. PCT/ES97/00034; filed Feb. 18, 1997 and published as WO97/43048 on Nov. 20, 1997 to which applicant claims priority under 35 U.S.C. § 365, said PCT application being the international version of Spanish Application No. P9601101, filed May 13, 1996 to which priority is claimed under 35 U.S.C. § 119 and 365. Applicant claims priority under the applicable section(s) of Title 35 of the United States Code to the extent possible to the above-referenced patent applications.

FIELD OF THE INVENTION

This invention relates generally to the field of dry particles and to devices and methods for creating dry particles.

BACKGROUND OF THE INVENTION

The creation of particulate matter is involved in a number of processes, including atomization for paint spraying, metal powder atomizing, fuel injection, and the production of pharmaceutical compositions. For many of these processes, the size and consistency of the particulate matter is central to the use. For example, the relationship between particle size and rate of release of a pharmaceutical composition is an important issue for pharmaceutical companies, since drug absorption (e.g. into the lungs) is controlled in large part by the size of the drug. It is thus critical for devices for pulmonary delivery of drug to deliver a controlled amount of drug that is available in the correct size range for proper adsorption and activity. If the pharmaceutical is outside the optimum range for proper pulmonary delivery it is wasteful of the material and, more importantly, the dosage of the pharmaceutical received by the patient cannot be controlled.

Particulate matter can be formed using any of a number of processes, including atomization. Atomization generally utilizes two fluids, a first containing the matter to be atomized, and a second fluid which functions to physically break up the subject fluid into droplets or particles. Existing atomization methods convert the type of energy supplied to the system into surface tension free energy since the fluid interface is dramatically expanded by the effect of the applied energy. Thus, the kinetic energy of the gas in pneumatic atomizers, the electrical energy in sonic and ultrasonic piezoelectric atomizers, the mechanical energy in rotary atomizers, and the electrostatic energy in electrohydrodynamic atomizers directly impact on the rate and efficiency of the formation of particles. As a function of the resulting degree of disorder, part of the energy is also degraded in the statistical dispersion of the resulting drop sizes. Depending on how disorderly and rapidly (or gradually and efficiently) the processes by which the above-mentioned energies are converted into free surface energy take place, the resulting sprays are suitable for different specific uses.

Existing pneumatic atomizers involve the cascading breakage of the interface from a high Weber number to a unity Weber number, the unity Weber number being attained when drop diameters result in surface tension forces that offset the inertia of the gas relative to the liquid. Such atomizers are described in S. Nukiyama and Y. Tanasawa, Trans. Soc. Mech. Eng. Jpn., 5, 68–75, (1939); I. D. Wigg, J. Inst. Fuel, 27, 500–505 (1964), G. E. Lorenzetto and A. H. Lefebvre, AIAA J., 15, 1006–1010 (1977); A. K. Jasuja, ASME Paper 82-GT-32. (1982); N. K. Risk and A. H. Lefebvre, Trans. ASME J. Eng. Gas Turbines Power, 106, 639–644, (1983); and A. Ünal, Metall. Trans. B., 20B, 613–622 (1989). Cascading processes in existing pneumatic atomizers involve highly turbulent flows and randomness, which can result in highly disperse drop size and atomizates. In addition, pneumatic atomizers are limited in the size drops they can provide (above 20 microns on average at best).

Whistling atomizers also have their pitfalls, prominent among which are noise, a relative complexity stemming from the use of wave generators and piezoelectric devices to excite the capillary jet produced, and a limited drop size that is generally larger than 50 $\mu$m.

One novel atomization system that can provide smaller, monodisperse drop sizes is electrostatic or electrospray atomization. The system has been disclosed by M. L. Colelough and T. J. Noakes, European Patent Application 87305187.4 (1987). The chief disadvantage of this method is that the energy required to create the atomizate requires using a high-voltage DC source, and hence a discharge system (e.g. electrical crowns), both of which add up to inherent complexity, large weight and low manipulability in this system.

Combined withdrawal of an interface between two immiscible fluids (e.g. two immiscible liquids or a liquid and a gas) has recently begun to be studied. See e.g. E. O. Tuck and J. M. van den Broek, J. Austral. Math. Soc. Ser. B., 25, 433–450, (1984); L. K. Forbes and G. C. Hocking, J. Austral. Math. Soc. Ser. B., 32, 231–249, (1990); and T. J. Singler and J. F. Geer Singler, Phys. Fluids A, 5, 1156–1166, (1993). The onset of combined withdrawal results in the sweeping of the fluid behind the free surface when the fluid in front of it is withdrawn at a given distance from the surface. Studies in this field have focused largely on the determination of parameters such as the distance from the sink to the free surface, the fluid density ratio, and the surface tension between the fluids, at the onset of combined withdrawal. However, the fluid dynamics of the microjet produced by combined withdrawal remained unexplored.

There is a need in the field for a method of reliably and reproducibly producing particles within a desired size range without expending a great amount of energy. Moreover, there is a need for such a method that produces a smaller and more uniform particle size.

SUMMARY OF THE INVENTION

Atomized particles within a desired size range (e.g., 1 micron to about 500 microns) are produced from a supercritical flow created by two immiscible fluids, a first fluid source containing the formulation to be atomized, and a second fluid source which is contained in a pressure chamber surrounding at least the area where the first liquid is to be provided. Upon presentation of the first fluid source to the second, the second fluid is forced out of an opening positioned in front of the flow path of the formulation. Supercritical flow is obtained when the first and second fluids interact dynamically to form a stable capillary microjet, which in turn results in the formation of a focusing funnel at the opening. Formulation passing through the focusing funnel will atomize upon exiting the opening of the pressurized chamber without physically contacting the perimeter of the opening. For the formation of dry particles, the first fluid is preferably a liquid, and the second fluid is preferably a gas, although two liquids may also be used provided they are generally immiscible. The first fluid liquid is preferably a solution containing a high concentration of solute. Alternatively, the first fluid liquid is a suspension containing a high concentration of suspended matter. In either case, the liquid quickly evaporates upon atomization (due to the small size of the particles formed) to leave very small dry particles.

In a first embodiment, the first fluid is forced through a single channel of a feeding needle and expelled out of an exit opening of the needle. The second fluid is forced out of an opening directly in front of the flow path of the formulation being expelled from the feeding needle.

In a second embodiment of the invention, the first fluid is comprised of a plurality of fluids that are forced through separate channels and expelled out of an exit opening of the needle. The stream of the different fluids contact prior to being expelled to creating a plurality of layers to be atomized. The second fluid is forced out of an opening directly in front of the flow path of the fluids being expelled from the feeding needle.

A feature of the invention is that the method can produce particles each of which are comprised of a plurality of formulations.

In yet a third embodiment of the invention, a planar feeding piece is used to obtain multiple microjets which are expelled through multiple exit ports of a pressure chamber to create multiple atomized streams.

A feature of the invention is that the diameter of the opening from which the fluid is expelled, the diameter of the opening from which gas is expelled, and the distance between these two openings is adjustable to obtain a stable liquid-gas interface which results in a supercritical flow creating a stable capillary jet between the gas and the liquid.

An aspect of the invention is a device and method which produces multiple streams of atomizate thereby quickly atomizing a large amount of formulation.

An object of the invention is to provide a method of creating dry particles of consistent particle size.

Another object of the invention is to provide a highly dispersible dry pharmaceutical particles containing a drug suitable for pulmonary delivery. Such particles should improve dosage by providing accurate and precise amounts of dispersable particles to a patient in need of treatment.

Another object of the invention is to provide particles suitable for use as a particle size standard in numerous applications.

An advantage of the invention is that it consistently produces atomizates having particles within a desired particle diameter range.

Another advantage of the invention is that the device of the invention is energy efficient in terms of the energy used to create small particles.

Another advantage of the invention is that the method of the invention does not impose size limitations of other methods of creating particles found in the art.

Another advantage of the invention is that it can produce large quantities of particles while expending relatively little energy.

Another advantage of the invention is that the opening from which the fluid is expelled does not accumulate deposits of the formulation.

Another advantage of the invention is that the particles are not prone to agglomeration following dispersion from the opening of the pressure chamber.

Another advantage is that the structure of the device and its use are simple.

Another advantage of the invention is that the particles formed of pharmaceutical are particularly useful in a dry powder inhaler due to the small size of the particles (e.g. 1, 2, 3, 4, or 5 microns in diameter) and conformity of size (e.g. 3 to 30% difference in diameter) from particle to particle.

These and other aspects, objects, features and advantages will become apparent to those skilled in the art upon reading this disclosure in combination with the figures provided.

BRIEF DESCRIPTION OF THE DRAWINGS

FIG. 3 is a schematic view of yet another embodiment showing a wedge-shaped planar source of formulation.

DETAILED DESCRIPTION OF PREFERRED EMBODIMENTS

Before the present device and method are described, it is to be understood that this invention is not limited to the particular components and steps described, as such may, of course, vary. It is also to be understood that the terminology used herein is for the purpose of describing particular embodiments only, and is not intended to be limiting, since the scope of the present invention will be limited only by the appended claims.

It must be noted that as used herein and in the appended claims, the singular forms "a", "and," and "the" include plural referents unless the context clearly dictates otherwise. Thus, for example, reference to "a particle" includes a plurality of particles and reference to "a pharmaceutical" includes reference to one or more pharmaceuticals and equivalents thereof known to those skilled in the art, and so forth.

Unless defined otherwise, all technical and scientific terms used herein have the same meaning as commonly understood to one of ordinary skill in the art to which this invention belongs. Although any methods, devices and materials similar or equivalent to those described herein can be used in the practice or testing of the invention, the preferred methods, devices and materials are now described.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

DEFINITIONS

The terms "particles", "atomized particles" and "atomized particles of formulation" are used interchangeably herein and shall mean particles of formulation that have been atomized using the device and method of the invention and includes particles of liquid formulations expelled outward from the pressure chamber opening in their liquid state prior to removal of solvent. The term "particle" also includes particles in their dry state following solvent removal. Particles may be comprised of any material depending on the desired end use, and preferably are comprised of a pharmaceutically active drug, or more preferably a drug suited for delivery by inhalation, e.g. insulin.

The term "substantially dry" as used herein refers to particle of formulation that include an amount of liquid carrier (e.g. water or ethanol) which is equal to (in weight) or less than the amount of drug in the particle. Preferably, a substantially dry particle contains less than 25% particle weight of liquid carrier, and more preferably less than 10% particle weight of liquid carrier.

The term "formulation" as used herein refers to any matter which is desired to be atomized. For example, the formulation may be of a pharmaceutical compound for inhalation. In another example, the formulation may be a particle for a size standard. In yet another example, the formulation may be a particle to increase the surface area of a combustible liquid for more efficient reaction. The formulation is presented in the method of the invention as a component of the first fluid. Formulations are preferably solutions, e.g., aqueous solutions, ethanolic solutions, aqueous/ethanolic solutions, saline solutions, colloidal suspensions and microcrystalline suspensions. Formulations for the production of pharmaceutical particles can be solutions or suspensions of drugs in the above mentioned liquids. Alternatively, the first fluid itself may be a formulation, with the resulting particles formed solely from the first fluid. Formulation may also refer to the matter that will make up a single component of a particle, e.g. either the nucleus or the coating of a multi-layered particle.

The term "pharmaceutical compound" and "active compound" means a compound which is either a pharmaceutically active drug, becomes or produces a therapeutic compound in the body or is a detectably labeled compound. In turn, a "pharmaceutically active drug" or therapeutic compound shall be interpreted to mean any pharmaceutically effective compound used in the treatment of disease. A "detectably labeled compound" includes compounds which are radioactively labeled see U.S. Pat. No. 5,829,436 issued Nov. 3, 1998 Re: detectable labels. Pharmaceutical formulations for use in the invention may be comprised of any therapeutic agent that can be atomized for patient delivery, e.g. for pulmonary delivery using an inhalation delivery system. Examples of such pharmaceutical compositions may be found in the Physicians Desk Reference (1998), and Remington: The Science and Practice of Pharmacy $19^{th}$ Edition (1995), both of which are incorporated herein by reference. These formulations may be in any form capable of atomization, such as a solution, a suspension, an emulsion, a slurry, etc., provided the dynamics of the form render it capable of forming a capillary microjet upon exposure to a second fluid.

The terms "air", "particle free air" and the like, are used interchangeably herein to describe a volume of air which is substantially free of other material and, in particular, free of particles intentionally added such as particles of formulation. The term means that the air does not include particles of formulation which have been intentionally added but is not intended to imply that the normal surrounding air has been filtered or treated to remove all particles although filtering can take place. Air is the preferred gas to use with drug delivery it being noted that other gas, e.g., $CO_2$ can be used.

DEVICE IN GENERAL

The present invention can be applied to the creation of particles for any number of uses. The present disclosure focuses on the general technology used to produce dry powders for use as standards and for use in pharmaceutical delivery of therapeutic compounds, more particularly dry powders used in a dry powder inhaler device. The methods of the invention are not to be limited to such uses, however, and other uses of the technology will be readily seen by those skilled in the art.

The basic technology of the invention comprises (1) a means for supplying a first fluid; and (2) a pressure chamber supplied with a second fluid. The first fluid is generally a liquid and preferably aqueous. The second fluid is generally a gas and preferably air. However, the first fluid may be a gas and second fluid a liquid or both fluids may be liquid provided the first and second fluid are sufficiently different from each other (immiscible) so as to allow for the formation of a stable microjet of the first fluid moving from the supply means to an exit port of the pressure chamber. Notwithstanding these different combinations of gas-liquid, liquid-gas, and liquid-liquid the invention is generally described with a liquid formulation being expelled from the supply means and forming a stable microjet due to interaction with surrounding air flow focusing the microjet to flow out of an exit of the pressure chamber.

Formation of the microjet and its acceleration and ultimate particle formation are based on the abrupt pressure drop associated with the steep acceleration experienced by the first fluid (e.g., a liquid) on passing through an exit orifice of the pressure chamber which holds the second fluid. On leaving the chamber the flow undergoes a large pressure difference between the first fluid (e.g., a liquid) and the second fluid (e.g., a gas), which in turn produces a highly curved zone on the first fluid (e.g., liquid) surface near the exit port of the pressure chamber and in the formation of a cuspidal point from which a steady microjet flows provided the amount of the first fluid (e.g., the liquid) withdrawn through the exit port of the pressure chamber is replenished. Thus, in the same way that a glass lens or a lens of the eye focuses light to a given point, the flow of the gas surrounds and focuses the liquid into a stable microjet. The focusing effect of the surrounding flow of gas creates a stream of liquid which is substantially smaller in diameter than the diameter of the exit orifice of the pressure chamber. This allows liquid to flow out of the pressure chamber orifice without touching the orifice, providing advantages including (1) clogging of the exit orifice is virtually eliminated, (2) contamination of flow due to contact with substances (e.g. bacteria) on the orifice opening is virtually eliminated, and (3) the diameter of the stream and the resulting particles are smaller than the diameter of the exit orifice of the chamber. This is particularly desirable because it is difficult to precisely engineer holes which are very small in diameter. Further, in the absence of the focusing effect (and formation a stable microjet) flow of liquid out of an opening will result in particles which have about twice the diameter of the exit opening. An additional advantage is that the particles are not prone to agglomeration following exit from the chamber.

Specific embodiments of aerosol creation devices are now described.

Figure 1:
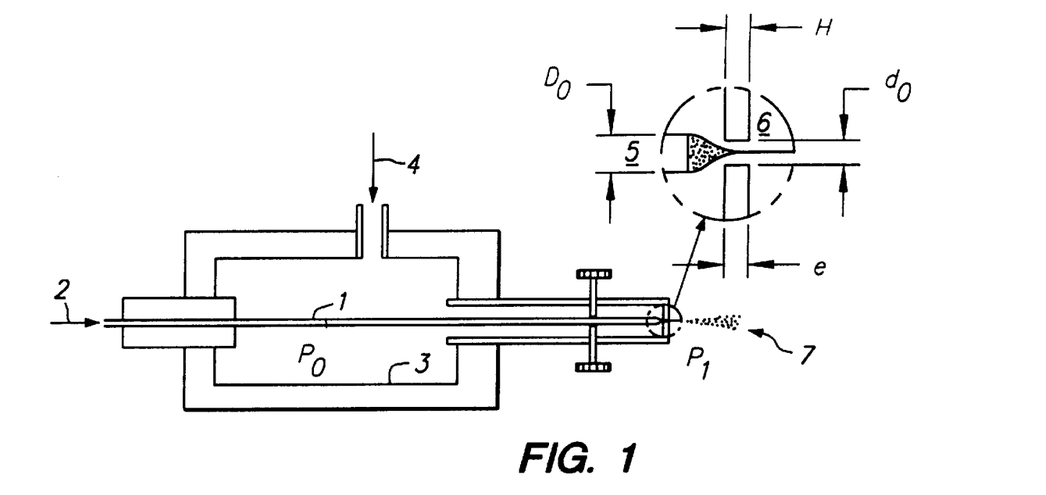
FIG. 1 is a schematic view showing the basic components of one embodiment of the invention with a cylindrical feeding needle as a source of formulation.

EMBODIMENT OF FIG. 1

A first embodiment of the invention where the supply means is a cylindrical feeding needle supplying liquid into a pressurized chamber of gas is described below with reference to FIG. 1.

The components of the embodiment of FIG. 1 are as follows:

1. Feeding needle—also referred to generally as a fluid source and a tube.
2. End of the feeding needle used to insert the liquid to be atomized.
3. Pressure chamber.
4. Orifice used as gas inlet.
5. End of the feeding needle used to evacuate the liquid to be atomized.
6. Orifice through which withdrawal takes place.
7. Atomizate (spray)—also referred to as aerosol.

$D_0$=diameter of the feeding needle; $d_0$=diameter of the orifice through which the microjet is passed; e=axial length of the orifice through which withdrawal takes place; H=distance from the feeding needle to the microjet outlet; $P_0$=pressure inside the chamber; $P_\alpha$=atmospheric pressure.

The device of the invention can be configured in a variety of designs, the different designs will all include the essential components shown in FIG. 1 or components which perform an equivalent function and obtain the desired results. Specifically, a device of the invention will be comprised of at least one source of formulation (e.g., a feeding needle with an opening 2) into which a liquid flowable formulation can be fed and an exit opening 5 from which the formulation can be expelled. The feeding needle 1, or at least its exit opening 5, is encompassed by a pressure chamber 3. The chamber 3 has inlet opening 4 which is used to feed gas into the chamber 3 and an exit opening 6 through which gas from the pressure chamber and liquid formulation from the feeding needle 3 are expelled creating an aerosol.

In FIG. 1, the feeding needle and pressure chamber are configured to obtain a desired result of producing an aerosol wherein the particles are small and uniform in size. Preferably the particles have a size which is in a range of 0.1 to 500 microns, more preferably 1 to 100 microns. Particles of less than 1 micron in diameter can also be produced via the present invention, but these particles may be too small for use in inhalation as the particles may not settle in the lung during a normal breath hold and as such would be exhaled. The particles of any given aerosol all have about the same diameter with a relative standard deviation of 10% to 30% or more preferably 3% to 20%. Stating that particles of the aerosol have a particle diameter in a range of 1 to 5 microns does not mean that different particles will have different diameters and that some will have a diameter of 1 micron while others of 5 microns. The particles in a given aerosol will all (preferably about 90% or more) have the same diameter ±3% to ±30%. For example, the particles of a given aerosol will have a diameter of 2 microns ±3% to ±10%.

Such a monodisperse aerosol is created using the components and configuration as described above. However, other components and configurations will occur to those skilled in the art. The object of each design will be to supply formulation so that it creates a stable capillary microjet which is accelerated and stabilized by tangential viscous stress exerted by the gas on the liquid surface. The stable microjet created by the gas leaves the area of the pressurized gas (e.g., leaves the pressure chamber and exits the pressure chamber orifice) and splits into particles which have the desired size and uniformity.

The aerosol created is a monodisperse aerosol meaning that the size of the particles produced are relatively uniform in size. The relative standard deviation in particle size is in the range of from about 10% to about 30%, preferably 3% to 10% and most preferably 3% or less. The size of aerosolized particles useful for inhalation is a diameter in the range of from about 0.1 micron to about 10 microns, more preferably about 1 micron to about 3 microns.

For purposes of simplicity the remainder of the detailed description of the operation of the device of FIG. 1 will refer to the first fluid as liquid and the second fluid as gas. The parameter window used (i e. the set of special values for the liquid properties, flow-rate used, feeding needle diameter, orifice diameter, pressure ratio, etc.) should be large enough to be compatible with virtually any liquid (dynamic viscosities in the range from $10^{-4}$ to 1 kg $m^{-1}s^{-1}$); in this way, the capillary microjet that emerges from the end of the feeding needle is absolutely stable and perturbations produced by breakage of the jet cannot travel upstream. Downstream, the microjet splits into evenly shaped drops simply by effect of capillary instability (see, for example, Rayleigh, "On the instability of jets", Proc. London Math. Soc., 4–13, 1878), similar in a manner to a laminar capillary jet falling from a half-open tap.

When the stationary, steady interface is created, the capillary jet that emerges from the end of the drop at the outlet of the feeding point is concentrically withdrawn into the nozzle. After the jet emerges from the drop, the liquid is accelerated by tangential sweeping forces exerted by the gas stream flowing on its surface, which gradually decreases the jet cross-section. Stated differently the gas flow acts as a lens and focuses and stabilizes the microjet as it moves toward and into the exit orifice of the pressure chamber.

The forces exerted by the second fluid (e.g., a gas) flow on the first fluid (e.g., a liquid) surface should be steady enough to prevent irregular surface oscillations. Therefore, any turbulence in the gas motion should be avoided; even if the gas velocity is high, the characteristic size of the orifice should ensure that the gas motion is laminar (similar to the boundary layers formed on the jet and on the inner surface of the nozzle or hole).

STABLE CAPILLARY MICROJET

Figure 4:
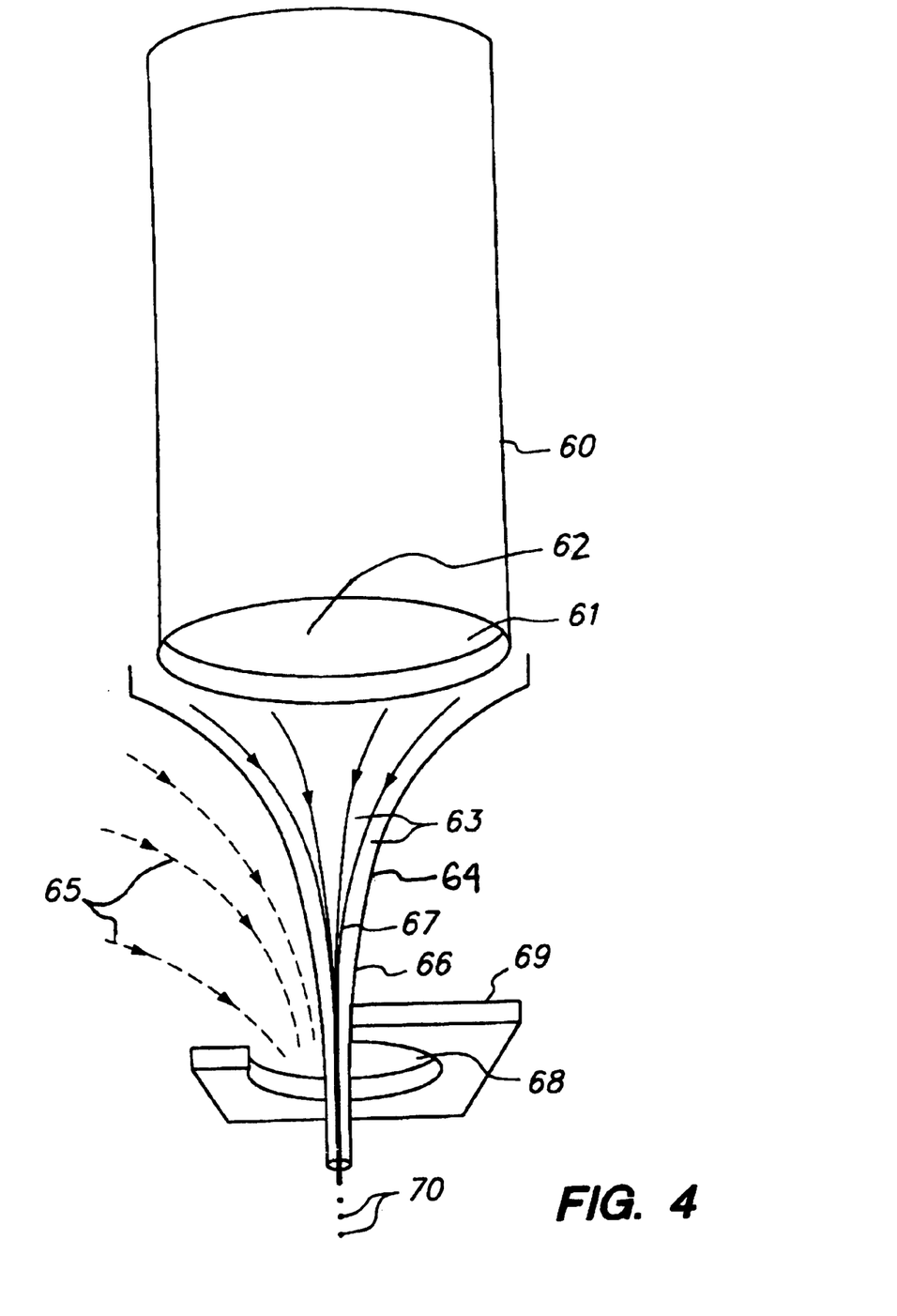
FIG. 4 is a schematic view of a stable capillary microjet being formed and flowing through an exit opening to thereafter form a monodisperse aerosol.
Figure 5:
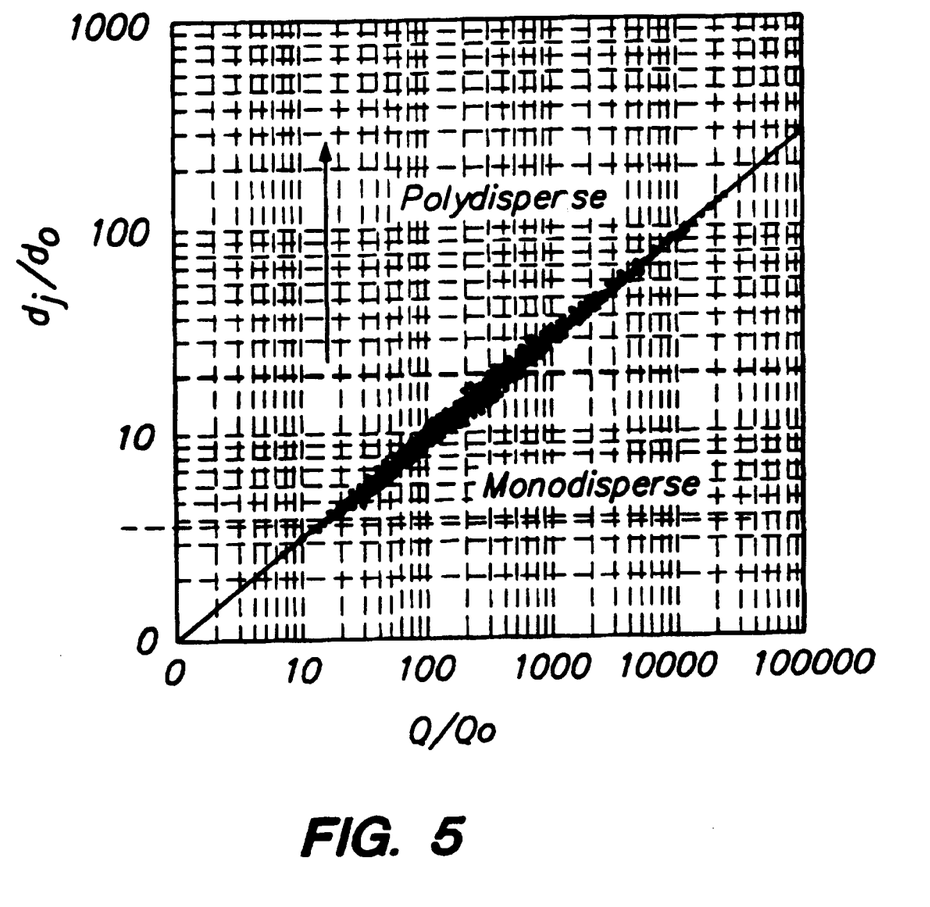
FIG. 5 is a graph of data where 350 measured valves of $d_j/d_o$ versus $Q/Q_o$ are plotted.

FIG. 4 illustrates the interaction of a liquid and a gas to form atomizate using the method of the invention. The feeding needle 60 has a circular exit opening 61 with an internal radius $R_0$ which feeds a liquid 62 out of the end, forming a drop with a radius in the range of $R_0$ to $R_0$ plus the thickness of the wall of the needle. The exiting liquid forms an infinite amount of liquid streamlines 63 that interact with the surrounding gas to form a stable cusp at the interface 64 of the two fluids. The surrounding gas also forms an infinite number of gas streamlines 65, which interact with the exiting liquid to create a virtual focusing funnel 66. The exiting liquid is focused by the focusing funnel 66 resulting in a stable capillary microjet 67, which remains stable until it exits the opening 68 of the pressure chamber 69. After exiting the pressure chamber, the microjet begins to break-up, forming monodispersed particles 70.

The gas flow, which affects the liquid withdrawal and its subsequent acceleration after the jet is formed, should be very rapid but also uniform in order to avoid perturbing the fragile capillary interface (the surface of the drop that emerges from the jet).

Liquid flows out of the end of a capillary tube and forms a small liquid drop at the end. The tube has an internal radius $R_o$. The drop has a radius in a range of from $R_o$ to $R_o$ plus the structural thickness of the tube as the drop exits the tube, and thereafter the drop narrows in circumference to a much smaller circumference as is shown in the expanded view of the tube (i.e. feeding needle) 5 as shown in FIGS. 1 and 4.

As illustrated in FIG. 4, the exit opening 61 of the capillary tube 60 is positioned close to an exit opening 68 in a planar surface of a pressure chamber 69. The exit opening 68 has a minimum diameter D and is in a planar member with a thickness L. The diameter D is referred to as a minimum diameter because the opening may have a conical configuration with the narrower end of the cone positioned closer to the source of liquid flow. Thus, the exit opening may be a funnel-shaped nozzle although other opening configurations are also possible, e.g. an hour glass configuration. Gas in the pressure chamber continuously flows out of the exit opening. The flow of the gas causes the liquid drop expelled from the tube to decrease in circumference as the liquid moves away from the end of the tube in a direction toward the exit opening of the pressure chamber.

In actual use, it can be understood that the opening shape which provqkes maximum gas acceleration (and consequently the most stable cusp and microjet with a given set of parameters) is a conically shaped opening in the pressure chamber. The conical opening is positioned with its narrower end toward the source of liquid flow.

The distance between the end 61 of the tube 60 and the beginning of the exit opening 68 is H. At this point it is noted that $R_o$, D, H and L are all preferably on the order of hundreds of microns. For example, $R_o$=400 $\mu$m, D=150 $\mu$m, H=1 mm, L=300 $\mu$m. However, each could be 1/100 to 100× these sizes.

The end of the liquid stream develops a cusp-like shape at a critical distance from the exit opening 68 in the pressure chamber 69 when the applied pressure drop $\Delta P_g$ through the exit opening 68 overcomes the liquid-gas surface tension stresses $\gamma/R^*$ appearing at the point of maximum curvature—e.g. $1/R^*$ from the exit opening.

A steady state is then established if the liquid flow rate Q ejected from the drop cusp is steadily supplied from the capillary tube. This is the stable capillary cusp which is an essential characteristic of the invention needed to form the stable microjet. More particularly, a steady, thin liquid jet with a typical diameter $d_j$ is smoothly emitted from the stable cusp-like drop shape and this thin liquid jet extends over a distance in the range of microns to millimeters. The length of the stable microjet will vary from very short (e.g. 1 micron) to very long (e.g. 50 mm) with the length depending on the (1) flow-rate of the liquid and (2) the Reynolds number of the gas stream flowing out of the exit opening of the pressure chamber. The liquid jet is the stable capillary microjet obtained when supercritical flow is reached. This jet demonstrates a robust behavior provided that the pressure drop $\Delta P_g$ applied to the gas is sufficiently large compared to the maximum surface tension stress (on the order of $\gamma/d_j$) that act at the liquid-gas interface. The jet has a slightly parabolic axial velocity profile which is, in large part, responsible for the stability of the microjet. The stable microjet is formed without the need for other forces, i.e. without adding force such as electrical forces on a charged fluid. However, for some applications it is preferable to add charge to particles, e.g. to cause the particles to adhere to a given surface. The shaping of liquid exiting the capillary tube by the gas flow forming a focusing funnel creates a cusp-like meniscus resulting in the stable microjet. This is a fundamental characteristic of the invention.

The fluid stream flowing from the tube has substantially more density and develops substantially more inertia as compared to the gas, which has lower viscosity than the liquid. These characteristics contribute to the formation of the stable capillary jet. The stable capillary microjet is maintained stably for a significant distance in the direction of flow away from the exit from the tube. The liquid is, at this point, undergoing "supercritical flow." The microjet eventually destabilizes due to the effect of surface tension forces. Destabilization results from small natural perturbations moving downstream, with the fastest growing perturbations being those which govern the break up of the microjet, eventually creating a uniform sized monodisperse aerosol 70 as shown in FIG. 4.

The microjet, even as it initially destabilizes, passes out of the exit orifice of the pressure chamber without touching the peripheral surface of the exit opening. This provides an important advantage of the invention which is that the exit opening 68 (which could be referred to as a nozzle) will not clog from residue and/or deposits of the liquid. Clogging is a major problem with very small nozzles and is generally dealt with by cleaning or replacing the nozzle. When fluid contacts the surfaces of a nozzle opening some fluid will remain in contact with the nozzle when the flow of fluid is shut off. The liquid remaining on the nozzle surface evaporates leaving a residue. After many uses over time the residue builds up and clogging takes place. The present invention substantially reduces or eliminates this clogging problem.

MATHEMATICS OF A STABLE MICROJET

Cylindrical coordinates (r,z) are chosen for making a mathematical analysis of a stable microjet, i.e. liquid undergoing "supercritical flow." The cusp-like meniscus formed by the liquid coming out of the tube is pulled toward the exit of the pressure chamber by a pressure gradient created by the flow of gas.

The cusp-like meniscus formed at the tube's mouth is pulled towards the hole by the pressure gradient created by the gas stream. From the cusp of this meniscus, a steady liquid thread with the shape of radius r=$\xi$ is withdrawn through the hole by the action of both the suction effect due to $\Delta P_g$, and the tangential viscous stresses $\tau_s$, exerted by the gas on the jet's surface in the axial direction. The averaged momentum equation for this configuration may be written:

$$\frac{d}{d_z}\left[P_1 + \frac{\rho_1 Q^2}{2\Pi^2 \xi^4}\right] = \frac{2\tau_s}{\xi}, \quad (1)$$

where Q is the liquid flow rate upon exiting the feeding tube, $P_1$ is the liquid pressure, and $\rho_1$ is the liquid density, assuming that the viscous extensional term is negligible compared to the kinetic energy term, as will be subsequently justified. In addition, liquid evaporation effects are neglected. The liquid pressure $P_1$ is given by the capillary equation.

$$P_1 = P_g + \gamma/\xi. \quad (2)$$

where $\gamma$ is the liquid-gas surface tension. As shown in the Examples, the pressure drop $\Delta P_g$ is sufficiently large as compared to the surface tension stress $\gamma/\xi$ to justify neglecting the latter in the analysis. This scenario holds for the whole range of flow rates in which the microjet is absolutely stable. In fact, it will be shown that, for a given pressure drop $\Delta P_g$, the minimum liquid flow rate that can be sprayed in steady jet conditions is achieved when the surface tension stress $\gamma/\xi$ is of the order of the kinetic energy of the liquid $\rho_1 Q^2/(2\pi^2\xi^4)$, since the surface tension acts like a "resistance" to the motion (it appears as a negative term in the right-hand side term of Eq. (1)). Thus, $$Q_{min} \sim \left(\frac{\gamma d_j^3}{\rho_1}\right)^{1/2} \tag{3}$$

For sufficiently large flow rates Q compared to $Q_{min}$, the simplified averaged momentum equation in the axial direction can be expressed as $$\frac{d}{d_z}\left(\frac{\rho_1 Q^2}{2\Pi^2\xi^4}\right) = \frac{dP_g}{d_z} + \frac{2\tau_s}{\xi}, \tag{4}$$

where one can identify the two driving forces for the liquid flow on the right-hand side. This equation can be integrated provided the following simplification is made: if one uses a thin plate with thickness L of the order or smaller than the hole's diameter D (which minimizes downstream perturbations in the gas flow), the pressure gradient up to the hole exit is on the average much larger than the viscous shear term $2\tau_s/\xi$ owning to the surface stress. On the other hand, the axial viscous term is of the order $O[\mu^2 Q/D^2 d_j^2]$, since the hole diameter D is actually the characteristic distance associated with the gas flow at the hole's entrance in both the radial and axial directions. This term is very small compared to the pressure gradient in real situations, provided that $\Delta P_g >> \mu^2/D^2\rho_1$ (which holds, e.g., for liquids with viscosities as large as 100 cpoises, using hole diameters and pressure drops as small as D~10 $\mu$m and $\Delta P_g$>100 mbar). The neglect of all viscous terms in Eq. (4) is then justified. Notice that in this limit on the liquid flow is quasi-isentropic in the average (the liquid almost follows Bernoulli equation) as opposed to most micrometric extensional flows. Thus, integrating (4) from the stagnation regions of both fluids up to the exit, one obtains a simple and universal expression for the jet diameter at the hole exit:

$$d_j \simeq \left(\frac{8\rho_1}{\Pi^2\Delta P_g}\right)^{1/4} Q^{1/2}, \tag{5}$$

which for a given pressure drop $\Delta P_g$ is independent of geometrical parameters (hole and tube diameters, tube-hole distance, etc.), liquid and gas viscosities, and liquid-gas surface tension. This diameter remains almost constant up to the breakup point since the gas pressure after the exit remains constant.

MONODISPERSE PARTICLES

Above the stable microjet undergoing "supercritical flow" is described and it can be seen how this aspect of the invention can be made use of in a variety of industrial applications—particularly where the flow of liquid through small holes creates a clogging problem. An equally important aspect of the invention is obtained after the microjet leaves the pressure chamber.

When the microjet exits the pressure chamber the liquid pressure $P_1$ becomes (like the gas pressure $P_g$) almost constant in the axial direction, and the jet diameter remains almost constant up to the point where it breaks up by capillary instability. Defining a Weber number $We=(\rho_g v_g^2 d_j)/\gamma \cong 2\Delta P_g d_j/\gamma$ (where $v_g$ is the gas velocity measured at the orifice), below a certain experimental value $We_c$~40 the breakup mode is axisymmetric and the resulting droplet stream is characterized by its monodispersity provided that the fluctuations of the gas flow do not contribute to droplet coalescence (these fluctuations occur when the gas stream reaches a fully developed turbulent profile around the liquid jet breakup region). Above this $We_c$ value, sinuous nonaxisymmetric disturbances, coupled to the axisymmetric ones, become apparent. For larger We numbers, the nonlinear growth rate of the sinuous disturbances seems to overcome that of the axisymmetric disturbances. The resulting spray shows significant polydispersity in this case. Thus, it can be seen that by controlling parameters to keep the resulting Weber number to 40 or less, allows the particles formed to be all substantially the same size. The size variation is about ±3% to ±30% and move preferably ±3% to ±10%. These particles can have a desired size e.g. 0.1 microns to 50 microns.

The shed vorticity influences the breakup of the jet and thus the formation of the particles. Upstream from the hole exit, in the accelerating region, the gas stream is laminar. Typical values of the Reynolds number range from 500 to 6000 if a velocity of the order of the speed of sound is taken as characteristic of the velocity of the gas. Downstream from the hole exit, the cylindrical mixing layer between the gas stream and the stagnant gas becomes unstable by the classical Kelvin-Helmholtz instability. The growth rate of the thickness of this layer depends on the Reynolds number of the flow and ring vortices are formed at a frequency of the order of $v_g/D$, where D is the hole diameter. Typical values of $v_g$ and D as those found in our experimental technique lead to frequencies or the order of MHz which are comparable to the frequency of drop production (of order of $t_b^{-1}$).

Given the liquid flow rate and the hole diameter, a resonance frequency which depends on the gas velocity (or pressure difference driving the gas stream) can be adjusted (tuned) in such a way that vortices act as a forcing system to excite perturbations of a determined wavelength on the jet surface. Experimental results obtained clearly illustrates the different degree of coupling between the two gas-liquid coaxial jets. In one set of experimental results the particle sizes are shown to have a particle size of about 5.7 microns with a standard deviation of 12%. This results when the velocity of the gas has been properly tuned to minimize the dispersion in the size of droplets resulting from the jet breakup. In this case, the flow rate of the liquid jet and its diameter are 0.08 μl s$^{-1}$ and 3 μm, respectively. Data have been collected using a MASTERSIZER from MALVERN Instruments. As the degree of coupling decreases, perturbations at the jet surface of different wavelengths become excited and, as it can be observed from the size distributions, the dispersion of the spray increases.

It is highly desirable in a number of different industrial applications to have particles which are uniform in size or to create aerosols of liquid particles which are uniform in size. For example, dry particles containing a pharmaceutically active drug could be created and designed to have a diameter of about 2 microns ±3%. These particles could be inhaled into the lungs of a patient for intrapulmonary drug delivery. Moreover, particle size can be adjusted to target a particular area of the respiratory tract.

The gas flow should be laminar in order to avoid a turbulent regime—turbulent fluctuations in the gas flow which have a high frequency and would perturb the liquid-gas interface. The Reynolds numbers reached at the orifice are $$Re = \frac{v_g d_0}{v_g} \sim 4000$$

where $v_g$ is the kinematic viscosity of the gas. Even though this number is quite high, there are large pressure gradients downstream (a highly convergent geometry), so that a turbulent regime is very unlikely to develop.

The essential difference from existing pneumatic atomizers (which possess large Weber numbers) and the present invention is that the aim of the present invention is not to rupture the liquid-gas interface but the opposite, i.e. to increase the stability of the interface until a capillary jet is obtained. The jet, which will be very thin provided the pressure drop resulting from withdrawal is high enough, splits into drops the sizes of which are much more uniform than those resulting from disorderly breakage of the liquid-gas interface in existing pneumatic atomizers.

Multiplexing is effective when the flow-rates needed exceed those on an individual cell. More specifically, a plurality of feeding sources or feeding needles may be used to increase the rate at which aerosols are created. The flow-rates used should also ensure the mass ratio between the flows is compatible with the specifications of each application. If multiplexing is needed, the liquid flow-rate should be as uniform as possible among cells; this may entail propulsion through several capillary needles, porous media or any other medium capable of distributing a uniform flow among different feeding points.

Each individual dry particle atomization device should consist of at least one feeding point (a capillary needle, a point with an open microchannel, a microprotuberance on a continuous edge, etc.) 0.002–2 mm (but, preferentially 0.01–0.4 mm) in diameter, where the drop emerging from the microjet can be anchored, and a small orifice 0.002–2 mm (preferentially 0.01–0.25 mm) in diameter facing the drop and separated 0.01–2 mm (preferentially 0.2–0.5 mm) from the feeding point. The orifice communicates the withdrawal gas around the drop, at an increased pressure, with the zone where the atomizate is produced, at a decreased pressure. The atomizer can be made from a variety of materials (metal, polymers, ceramics, glass).

FIG. 1 depicts a tested prototype where the liquid to be atomized is inserted through one end of the system 2 and the propelling gas in introduced via the special inlet 4 in the pressure chamber 3. The prototype was tested at gas feeding rates from 100 to 2000 mBar above the atmospheric pressure $P_\alpha$ at which the atomized liquid was discharged. The whole enclosure around the feeding needle 1 was at a pressure $P_0 > P_\alpha$. The liquid feeding pressure, $P_1$, should always be slightly higher than the gas propelling pressure, $P_o$. Depending on the pressure drop in the needle and the liquid feeding system, the pressure difference ($P_1 - P_0 > 0$) and the flow-rate of the liquid to be atomized, Q, are linearly related provided the flow is laminar—which is indeed the case with this prototype. The critical dimensions are the distance from the needle to the plate (H), the needle diameter ($D_0$), the diameter of the orifice through which the microjet 6 is discharged ($d_0$) and the axial length, e, of the orifice (i.e. the thickness of the plate where the orifice is made). In this prototype, H was varied from 0.3 to 0.7 mm on constancy of the distances ($D_0 = 0.45$ mm, $d_0 - 0.2$ mm) and e–0.5 mm. The quality of the resulting spray 7 did not vary appreciably with changes in H provided the operating regime (i.e. stationary drop and microjet) was maintained. However, the system stability suffered at the longer H distances (about 0.7 mm). The other atomizer dimensions had no effect on the spray or the prototype functioning provided the zone around the needle (its diameter) was large enough relative to the feeding needle.

WEBER NUMBER

Adjusting parameters to obtain a stable capillary microjet and control its breakup into monodisperse particle is governed by the Weber number and the liquid-to-gas velocity ratio or α which equal $V_l/V_g$. The Weber number or "We" is defined by the following equation:

$$We = \frac{\rho_g V_g^2 d}{\gamma}$$

wherein $\rho_g$ is the density of the gas, d is the diameter of the stable microjet, γ is the liquid-gas surface tension, and $V_g^2$ is the velocity of the gas squared.

When carrying out the invention the parameters should be adjusted so that the Weber number is greater than 1 in order to produce a stable capillary microjet. However, to obtain a particle dispersion which is monodisperse (i.e. each particle has the same size ±3 to ±30%) the parameters should be adjusted so that the Weber number is less than 40. The monodisperse aerosol is obtained with a Weber number in a range of about 1 to about 40 when the breaking time is sufficiently small to avoid non-symmetric perturbations. ($1 \leq We \leq 40$)

OHNESORGE NUMBER

A measure of the relative importance of viscosity on the jet breakup can be estimated from the Ohnesorge number defined as the ratio between two characteristic times: the viscous time $t_v$ and the breaking time $t_b$. The breaking time $t_b$ is given by [see Rayleigh (1878)]

$$t_b \sim \left(\frac{\rho_l d^2}{\gamma}\right)^{1/2}. \quad (2)$$

Perturbations on the jet surface are propagated inside by viscous diffusion in times $t_v$ of the order of $$t_v \sim \rho_l d^2/\mu_1, \quad (3)$$

where $\mu_1$ is the viscosity of the liquid. Then, the Ohnesorge number, Oh, results $$Oh = \frac{\mu_1}{(\rho_l \gamma d)^{1/2}}. \quad (4)$$

If this ratio is much smaller than unity viscosity plays no essential role in the phenomenon under consideration. Since the maximum value of the Ohnesorge number in actual experiments conducted is as low as $3.7 \times 10^{-2}$, viscosity plays no essential role during the process of jet breakup.

Figure 2:
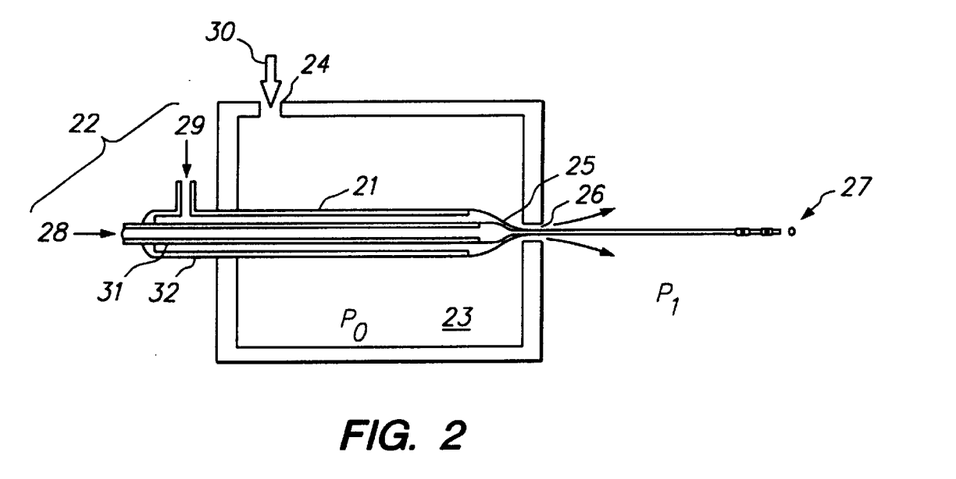
FIG. 2 is a schematic view of another embodiment of the invention with two concentric tubes as a source of formulation.

EMBODIMENT OF FIG. 2

A variety of configurations of components and types of fluids will become apparent to those skilled in the art upon reading this disclosure. These configurations and fluids are encompassed by the present invention provided they can produce a stable capillary microjet of a first fluid from a source to an exit port of a pressure chamber containing a second fluid. The stable microjet is formed by the first fluid flowing from the feeding source to the exit port of the pressure chamber being accelerated and stabilized by tangential viscous stress exerted by the second fluid in the pressure chamber on the surface of the first fluid forming the microjet. The second fluid forms a focusing funnel when a variety of parameters are correctly tuned or adjusted. For example, the speed, pressure, viscosity and miscibility of the first and second fluids are chosen to obtain the desired results of a stable microjet of the first fluid focused into the center of a funnel formed with the second fluid. These results are also obtained by adjusting or tuning physical parameters of the device, including the size of the opening from which the first fluid flows, the size of the opening from which both fluids exit, and the distance between these two openings.

The embodiment of FIG. 1 can, itself, be arranged in a variety of configurations. Further, as indicated above, the embodiment may include a plurality of feeding needles. A plurality of feeding needles may be configured concentrically in a single construct, as shown in FIG. 2.

The components of the embodiment of FIG. 2 are as follows:

21. Feeding needle—tube or source of fluid.
22. End of the feeding needle used to insert the liquids to be atomized.
23. Pressure chamber.
24. Orifice used as gas inlet.
25. End of the feeding needle used to evacuate the liquid to be atomized.
26. Orifice through which withdrawal takes place.
27. Atomizate (spray) or aerosol.
28. First liquid to be atomized (inner core of particle).
29. Second liquid to be atomized (outer coating of particle).
30. Gas for creation of microjet.
31. Internal tube of feeding needle.
32. External tube of feeding needle.

D=diameter of the feeding needle; d=diameter of the orifice through which the microjet is passed; e=axial length of the orifice through which withdrawal takes place; H=distance from the feeding needle to the microjet outlet; γ=surface tension; $P_0$=*pressure inside the chamber;* $P_\alpha$=atmospheric pressure.

The embodiment of FIG. 2 is preferably used when attempting to form a spherical particle of one substance coated by another substance. The device of FIG. 2 is comprised of the same basic component as per the device of FIG. 1 and further includes a second feeding source 32 which is positioned concentrically around the first cylindrical feeding source 31. The second feeding source may be surrounded by one or more additional feeding sources with each concentrically positioned around the preceding source. The outer coating may be used for a variety of purposes, including: coating particles to prevent small particles from sticking together; to obtain a sustained release effect of the active compound (e.g. a pharmaceutically active drug) inside, and/or to mask flavors; and to protect the stability of another compound (e.g. a pharmaceutically active drug) contained therein. The coating could merely prevent the particles from degrading, reacting, or sticking together.

The process is based on the microsuction which the liquid-gas or liquid-liquid interphase undergoes (if both are immiscible), when said interphase approaches a point beginning from which one of the fluids is suctioned off while the combined suction of the two fluids is produced. The interaction causes the fluid physically surrounded by the other to form a capillary microjet which finally breaks into spherical drops. If instead of two fluids (gas-liquid), three or more are used that flow in a concentric manner by injection using concentric tubes, a capillary jet composed of two or more layers of different fluids is formed which, when it breaks, gives rise to the formation of spheres composed of several approximately concentric spherical layers of different fluids.

The size of the outer sphere (its thickness) and the size of the inner sphere (its volume) can be precisely adjusted, and this may be used to design pharmaceutical formulations for various purposes. For instance, the coating of a multilayer particle may be varied to allow for difference in the rate of metabolism of an active pharmaceutical, which will in turn control the rate of action of the pharmaceutical. Thus, by varying the coating of a consistent amount of active ingredient, a controlled release effect of the active ingredient of the formulation can be achieved. In another example, by varying the nucleus size of a formulation with respect to the coating size, different dosages of a single active ingredient may be produced that have approximately the same tablet size. The latter example is useful for medications that vary in concentration over a given amount of time (e.g. cyclical medications such as estradiol).

The method is based on the breaking of a capillary microjet composed of a nucleus of one liquid or gas and surrounded by another or other liquids and gases which are in a concentric manner injected by a special injection head, in such a way that they form a stable capillary microjet and that they do not mix by diffusion during the time between when the microjet is formed and when it is broken. When the capillary microjet is broken into spherical drops under the proper operating conditions, which will be described in detail below, these drops exhibit a spherical nucleus, the size and eccentricity of which can be controlled.

In the case of spheres containing two materials, the injection head 25 consists of two concentric tubes with an external diameter on the order of one millimeter. Through the internal tube 31 is injected the material that will constitute the nucleus of the microsphere, while between the internal tube 31 and the external tube 32 the coating is injected. The fluid of the external tube 32 joins with the fluid of tube 31 as the fluids exit the feeding needle, and the fluids (normally liquids) thus injected are accelerated by a stream of gas that passes through a small orifice 24 facing the end of the injection tubes. When the drop in pressure across the orifice 24 is sufficient, the liquids form a completely stationary capillary microjet if the quantities of liquids that are injected are stationary. This microjet does not touch the walls of the orifice, but passes through it wrapped in the stream of gas or funnel formed by gas from the tube 32. Because the funnel of gas focuses the liquid, the size of the exit orifice 26 does not dictate the size of the particles formed.

When the parameters are correctly adjusted, the movement of the liquid is uniform at the exit of the orifice 26 and the viscosity forces are sufficiently small so as not to alter either the flow or the properties of the liquids; for example, if there are biochemical molecular specimens having a certain complexity and fragility, the viscous forces that would appear in association with the flow through a micro-orifice might degrade these substances.

FIG. 2 shows a simplified diagram of the feeding needle 21, which is comprised of the concentric tubes 30, 31 through the internal and external flows of the fluids 28, 29 that are going to compose the microspheres comprised of two immiscible fluids. The difference in pressures $P_0-P_\alpha$ ($P_0>P_\alpha$) through the orifice 26 establishes a flow of gas present in the chamber 23 and which is going to surround the microjet at its exit. The same pressure gradient that moves the gas is the one that moves the microjet in an axial direction through the hole 26, provided that the difference in pressures $P_0-P_\alpha$ is sufficiently great in comparison with the forces of surface tension, which create an adverse gradient in the direction of the movement.

There are two limitations for the minimum sizes of the inside and outside jets that are dependent (a) on the surface tensions γ1 of the outside liquid 29 with the gas 30 and γ2 of the outside liquid 29 with the inside liquid 28, and (b) on the difference in pressures $\Delta P=P_0-P_\alpha$ through the orifice 26. In the first place, the jump in pressures ΔP must be sufficiently great so that the adverse effects of the surface tension are minimized. This, however, is attained for very modest pressure increases: for example, for a 10 micron jet of a liquid having a surface tension of 0.05 N/m (tap water), the necessary minimum jump in pressure is in the order of 0.05 (N/m)/0.00001 m=ΔP=50 mBar. But, in addition, the breakage of the microjet must be regular and axilsymmetric, so that the drops will have a uniform size, while the extra pressure ΔP cannot be greater than a certain value that is dependent on the surface tension of the outside liquid with the gas γ1 and on the outside diameter of the microjet. It has been experimentally shown that this difference in pressures cannot be greater than 20 times the surface tension γ1 divided by the outside radius of the microjet.

Therefore, given some inside and outside diameters of the microjet, there is a range of operating pressures between a minimum and a maximum; nonetheless, experimentally the best results are obtained for pressures in the order of two to three times the minimum.

The viscosity values of the liquids must be such that the liquid with the greater viscosity $\mu_{max}$ verifies, for a diameter d of the jet predicted for this liquid and a difference through the orifice ΔP, the inequality:

$$\mu_{max} \leq \frac{\Delta P d^2 D}{Q}$$

With this, the pressure gradients can overcome the extensional forces of viscous resistance exerted by the liquid when it is suctioned toward the orifice.

Moreover, the liquids must have very similar densities in order to achieve the concentricity of the nucleus of the microsphere, since the relation of velocities between the liquids moves according to the square root of the densities $v1/v2=(\rho2/\rho1)^{1/2}$ and both jets, the inside jet and the outside jet, must assume the most symmetrical configuration possible, which does not occur if the liquids have different velocities (FIG. 2). Nonetheless, it has been experimentally demonstrated that, on account of the surface tension γ2 between the two liquids, the nucleus tends to migrate toward the center of the microsphere, within prescribed parameters.

When two liquids and gas are used on the outside, the distance between the planes of the mouths of the concentric tubes can vary, without the characteristics of the jet being substantially altered, provided that the internal tube 31 is not introduced into the external one 32 more than one diameter of the external tube 32 and provided that the internal tube 31 does not project more than two diameters from the external tube 32. The best results are obtained when the internal tube 31 projects from the external one 32 a distance substantially the same as the diameter of the internal tube 31. This same criterion is valid if more than two tubes are used, with the tube that is surrounded (inner tube) projecting beyond the tube that surrounds (outer tube) by a distance substantially the same as the diameter of the first tube.

The distance between the plane of the internal tube 31 (the one that will normally project more) and the plane of the orifice may vary between zero and three outside diameters of the external tube 32, depending on the surface tensions between the liquids and with the gas, and on their viscosity values. Typically, the optimal distance is found experimentally for each particular configuration and each set of liquids used.

The proposed atomizing device obviously requires fluids that are going to be used in the production of particles to have certain flow parameters. Accordingly, flows for this use must be:

Flows that are suitable so that the system falls within the parametric window of stability. Multiplexing (i.e. several sets of concentric tubes) may be used, if the flows required are greater than those of an individual cell, or to obtain multilayered particles If the flows are varied, the characteristic time of this variation must be less than the hydrodynamic residence times of liquid and gas in the microjet, and less than the inverse of the first natural oscillation frequency of the drop formed at the end of the injection needle.

Therefore, any means for continuous supply of gas (compressors, pressure deposits, etc.) and of liquid (volumetric pumps, pressure bottles) may be used. If multiplexing is desired, the flow of liquid must be as homogeneous as possible between the various cells, which may require impulse through multiple capillary needles, porous media, or any other medium capable of distributing a homogeneous flow among different feeding points.

Each atomizing device will consist of concentric tubes 31, 32 with a diameter ranging between 0.05 and 2 mm, preferably between 0.1 and 0.4 mm, on which the drop from which the microjet emanates can be anchored, and a small orifice (between 0.001 and 2 mm in diameter, preferably between 0.1 and 0.25 mm), facing the drop and separated from the point of feeding by a distance between 0.001 and 2 mm, preferably between 0.2 and 0.5 mm. The orifice puts the suction gas that surrounds the drop, at higher pressure, in touch with the area in which the atomizing is to be attained, at lower pressure.

Figure 3A:
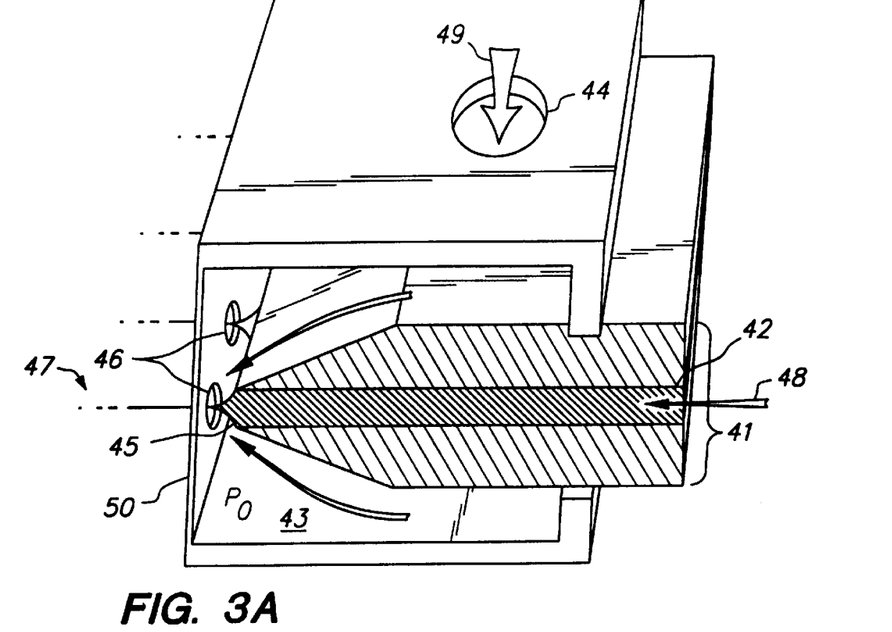
FIG. 3a illustrates a cross-sectional side view of the planar feeding source and the interaction of the fluids.
Figure 3B:
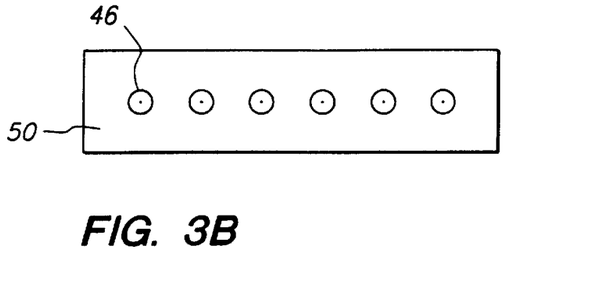
FIG. 3b show a frontal view of the openings in the pressure chamber, with the multiple openings through which the atomizate exits the device.
Figure 3C:
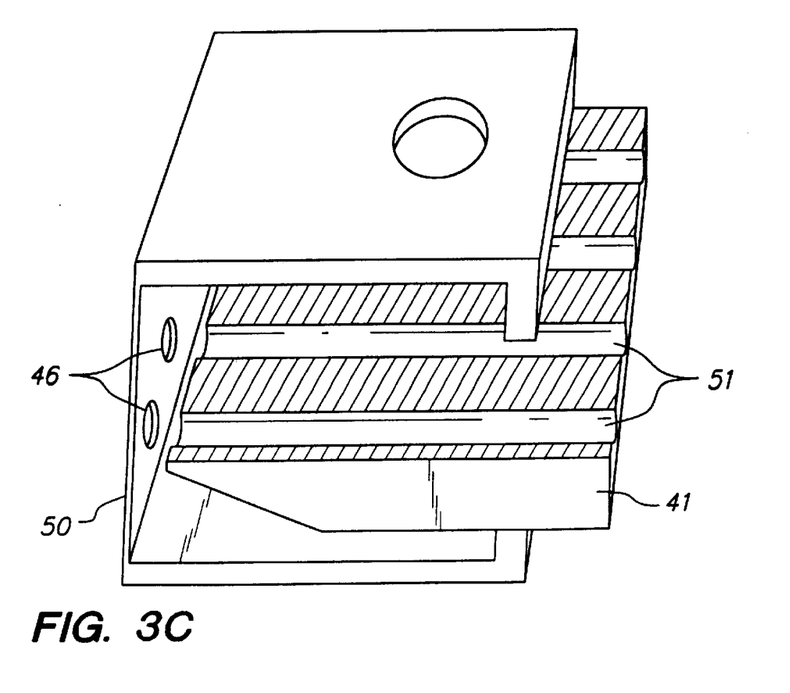
FIG. 3c illustrates the channels that are optionally formed within the planar feeding member. The channels are aligned with the openings in the pressure chamber.

EMBODIMENT OF FIG. 3

The embodiments of FIGS. 1 and 2 are similar in a number of ways. Both have a feeding piece which is preferably in the form of a feeding needle with a circular exit opening. Further, both have an exit port in the pressure chamber which is positioned directly in front of the flow path of fluid out of the feeding source. Precisely maintaining the alignment of the flow path of the feeding source with the exit port of the pressure chamber can present an engineering challenge particularly when the device includes a number of feeding needles. The embodiment of FIG. 3 is designed to simplify the manner in which components are aligned. The embodiment of FIG. 3 uses a planar feeding piece (which by virtue of the withdrawal effect produced by the pressure difference across a small opening through which fluid is passed) to obtain multiple microjets which are expelled through multiple exit ports of a pressure chamber thereby obtaining multiple aerosol streams. Although a single planar feeding member as shown in FIG. 3 it, of course, is possible to produce a device with a plurality of planar feeding members where each planar feeding member feeds fluid to a linear array of outlet orifices in the surrounding pressure chamber. In addition, the feeding member need not be strictly planar, and may be a curved feeding device comprised of two surfaces that maintain approximately the same spatial distance between the two pieces of the feeding source. Such curved devices may have any level of curvature, e.g. circular, semicircular, elliptical, hemi-elliptical etc.

The components of the embodiment of FIG. 3 are as follows:

41. Feeding piece.

42. End of the feeding piece used to insert the fluid to be atomized.

43. Pressure chamber.

44. Orifice used as gas inlet.

45. End of the feeding needle used to evacuate the liquid to be atomized.

46. Orifices through which withdrawal takes place.

47. Atomizate (spray) or aerosol.

48. first fluid containing material to be atomized.

49. second fluid for creation of microjet.

50. wall of the propulsion chamber facing the edge of the feeding piece.

51. channels for guidance of fluid through feeding piece.

$d_j$=diameter of the microjet formed; $\rho_A$=liquid density of first fluid (48); $\rho_B$=liquid density of second fluid (49); $v_A$=velocity of the first liquid (48); $v_b$=velocity of the second liquid (49); e=axial length of the orifice through which withdrawal takes place; H=distance from the feeding needle to the microjet outlet; $P_0$=pressure inside the chamber;

$\Delta p_g$=change in pressure of the gas; $P_\alpha$=atmospheric pressure; Q=volumetric flow rate The proposed particle production device consists of a feeding piece 41 which creates a planar feeding channel through which a where a first fluid 48 flows. The flow is preferably directed through one or more channels of uniform bores that are constructed on the planar surface of the feeding piece 41. A pressure chamber 43 that holds the flow of a second liquid 49, houses the feeding piece 41 and is under a pressure above maintained outside the chamber wall 50. One or more orifices, openings or slots (outlets) 46 made in the wall 52 of the pressure chamber face the edge of the feeding piece. Preferably, each bore or channel of the feeding piece 41 has its flow path substantially aligned with an outlet 46.

Formation of the microjet and its acceleration are based on the abrupt pressure drop resulting from the steep acceleration undergone by the second fluid 49 on passing through the orifice 46, similarly to the procedure described above for embodiments of FIGS. 1 and 2 when the second fluid 49 is a gas.

When the second fluid 49 is a gas and the first fluid 48 is a liquid, the microthread formed is quite long and the liquid velocity is much smaller than the gas velocity. In fact, the low viscosity of the gas allows the liquid to flow at a much lower velocity; as a result, the microjet is actually produced and accelerated by stress forces normal to the liquid surface, i.e. pressure forces. Hence, one effective approximation to the phenomenon is to assume that the pressure difference established will result in the same kinetic energy per unit volume for both fluids (liquid and gas), provided gas compressibility effects are neglected. The diameter $d_j$ of the microjet formed from a liquid density $\rho_1$ that passes at a volumetric flow-rate Q through an orifice across which a pressure difference $\Delta P_g$ exists will be given by $$d_j \cong \left(\frac{8\rho_l}{\pi^2 \Delta P_g}\right)^{1/4} Q^{1/2}$$

See Gañan-Calvo, *Physical Review Letters*, 80:285–288 (1998).

The relation between the diameter of the microjet, $d_j$, and that of the resulting drops, $\bar{d}$, depends on the ratio between viscous forces and surface tension forces on the liquid on the one hand, and between dynamic forces and surface tension forces on the gas on the other (i.e. on the Ohnesorge and Weber numbers, respectively) (Hinds (*Aerosol Technology*, John & Sons, 1982), Lefevre (*Atomization and Sprays*, Hemisphere Pub. Corp., 1989) and Bayvel & Orzechowski (*Liquid Atomization*, Taylor & Francis, 1993)). At moderate to low gas velocities and low viscosities the relation is roughly identical with that for capillarity instability developed by Rayleigh:

$$\bar{d}=1.89\ d_j$$

Because the liquid microjet is very long, at high liquid flow-rates the theoretical rupture point lies in the turbulent zone created by the gas jet, so turbulent fluctuations in the gas destabilize or rupture the liquid microjet in a more or less uneven manner. As a result, the benefits of drop size uniformity are lost.

On the other hand, when the second fluid 49 is a liquid and the first fluid 48 is a gas, the facts that the liquid is much more viscous and that the gas is much less dense virtually equalize the fluid and gas velocities. The gas microthread formed is much shorter; however, because its rupture zone is almost invariably located in a laminar flowing stream, dispersion in the size of the microbubbles formed is almost always small. At a volumetric gas flow-rate $Q_g$ and a liquid overpressure $\Delta P_1$, the diameter of the gas microjet is given by $$d_j \cong \left(\frac{8\rho_l}{\pi^2 \Delta P_l}\right)^{1/4} Q_g^{1/2}$$

The low liquid velocity and the absence of relative velocities between the liquid and gas lead to the Rayleigh relation between the diameters of the microthread and those of the bubbles (i.e. d=1.89 $d_j$).

If both fluids 48, 49 are liquid and scarcely viscous, then their relative velocities will be given by $$\frac{v_A}{v_B} = \left(\frac{\rho_B}{\rho_A}\right)^{1/2}$$

The diameter of a microjet of the first liquid at a volumetric flow-rate of A $Q_A$ and an overpressure of B$\Delta P_B$ will be given by $$d_j \cong \left(\frac{8\rho_A}{\pi^2 \Delta P_B}\right)^{1/4} Q_A^{1/2}$$

At viscosities such that the velocities of both fluids 48, 49 will rapidly equilibrate in the microjet, the diameter of the microjet of the first liquid will be given by $$d_j \cong \left(\frac{8\rho_B}{\pi^2 \Delta P_B}\right)^{1/4} Q_A^{1/2}$$

The proposed device obviously requires delivery of the fluids 48, 49 in the dispersion process at appropriate flow-rates. Thus:

(1) Both flow-rates should be adjusted for the system so that they lie within the stable parameter window.
(2) The mass ratio between the flows should be compatible with the specifications of each application. Obviously, the gas flow-rate can be increased by using an external means in special applications (e.g. burning, drug inhalation) since this need not interfere with the atomizer operation.
(3) If the flow-rates are altered, the characteristic time for the variation should be shorter than the hydrodynamic residence times for the liquid and gas in the microjet, and smaller than the reciprocal of the first natural oscillation frequency of the drop formed at the end of the feeding piece.
(4) Therefore, the gas and liquid can be dispensed by any type of continuous delivery system (e.g. a compressor or a pressurized tank the former and a volumetric pump or a pressurized bottle the latter).
(5) The device of the invention can be made from a variety of materials (metal, plastic, ceramics, glass).

FORMULATION COMPOSITIONS IN GENERAL

The compositions used in the invention for producing particles will depend in part on the chemical nature of the formulation to be atomized. For example, if a formulation to be atomized is hydrophilic, then the fluid containing the formulation used in the method of the invention is preferably aqueous, and the second fluid is preferably either a gas, more preferably air, or a liquid immiscible with the first. If a formulation is hydrophobic, e.g. a steroid, it preferably is at least partially dissolved in an organic solution. The organic solution may be used to present the formulation in the method of the invention, or alternatively the organic solution containing the formulation may be suspended in an aqueous solution.

Generally, the moisture in the particle can be controlled during production of the particles by the choice of carrier solution, the temperatures used in the production of the particles, and by the environment in which the atomizate is produced and/or stored. For example, if the atomizate is produced into a current of warm gas, and preferably warm filtered air, this evaporates the water from the particle. The gas is preferably provided in an amount sufficient to produce drying of the liquid droplets without compromising the desired shape and/or chemical activity of the formulation. Alternatively, the moisture of the particles can be altered after production. For example, collected particles may be lyophilized, and such lyophilization may take place with or without a concurrent change in temperature. In another example, the particles may be freeze-dried, and the water sublimed from the particles. Other methods of drying the particles can also be employed, including exposure or storage of the particles with a dessicant, and will be well known to those skilled in the art. See e.g. Remington: The Science and Practice of Pharmacy 19$^{th}$ Edition (1995) at pages 1598–1614.

COMPOSITIONS FOR PHARMACEUTICAL FORMULATIONS

One aspect of this invention is a dispersible dry power composition suitable for administration to a subject preferably by inhalation, and particularly oral inhalation. Such compositions are comprised of a therapeutically effective amount of an therapeutic agent. Such compositions may also comprise a pharmaceutically-acceptable excipient or other additive that will enhance the effectiveness of the pharmaceutical agent, stabilize the active agent in the formulation, etc.

Pharmaceutical formulations for use in the invention may be comprised of any therapeutic agent that can be atomized for patient delivery, e.g. for pulmonary delivery using an inhalation delivery system. Examples of such pharmaceutical compositions may be found in the Physicians Desk Reference (1998), and Remington: The Science and Practice of Pharmacy 19$^{th}$ Edition (1995), both of which are incorporated herein by reference. These formulations may be in any form capable of atomization, such as a solution, a suspension, an emulsion, a slurry, etc., provided the dynamics of the form render it capable of forming a capillary microjet upon exposure to a second fluid.

If a pharmaceutical formulation is comprised of hydrophilic drug, it is preferable to dissolve the drug in an aqueous-based solution. Examples of hydrophilic therapeutic compounds are. The component of the composition that is an active agent includes any agent that is useful for treating a human subject by inhalation therapy. Types of active agents suitable for use in the composition include bronchodilators (e.g. adrenalin, isoproterenol, metaproterenol, terbutaline and its salts, isoetharine, albuterol and its salts, pirbuterol and its salts, bitolter-ate, and the like), mast cell inhibitors (cromolyn sodium, and the like), antibiotics (e.g. pentamidine), any of the hydrophilic vitamins (e.g. cyanocobalamin), low molecular weight polypeptides such as growth factor peptides, e.g. LHRH and its derivatives (LHRH, nafarelin, goserelin, leuprolide, and the like), high molecular weight polypeptides such as interferon or growth factor receptors, and any other therapeutic agent that is suitable for pulmonary delivery. Also an RNA or DNA sequence that is useful for gene therapy may be employed as part of the composition of this invention. Generally the amount of active agent present in the composition will vary between about 0.1% w to about 90% w., preferably from about 1.0% w. to about 5% w. and most preferably from about 1.0% w to about 2% weight.

In one preferred embodiment, the pharmaceutical formulation contains recombinant human insulin or an analog of human insulin—preferably a monomeric analog. One such human insulin analog is a Lys (B28) Pro(B29) insulin analog, sold commercially as Humalog™, which is available publically from Eli Lilly & Co. This insulin analog is disclosed in U.S. Pat. Nos. 5,514,646 and 5,700,662, which are both incorporated herein by reference. U.S. patent application Ser. No. 074,558 also discloses a superactive human insulin analog, [10-Aspartic Acid-B] human insulin, which has increased activity over natural human insulin. Specifically, [10-Aspartic Acid-B] human insulin was determined to be 4 to 5 times more potent than natural insulins. U.S. patent application Ser. No. 273,957 and International Application Serial No. PCT/US88/02289 disclose other superactive insulin analogs, des-pentapeptide (B26-B30)-[$Asp^{B10}$, $Tyr^{B25}$-α-carboxamide] human insulin, (B26-B30)-[$Glu^{B10}$, $Tyr^{B25}$-α-carboxamide] human insulin, and further insulin analogs of the formula des(B26-B30)-[$X^{B10}$, $Tyr^{B25}$-α-carboxamide] human insulin, in which X is a residue substituted at position 10 of the B chain. These insulin analogs have potencies anywhere from 11 to 20 times that of natural human insulin. All of the above-described insulin analogs involve amino acid substitutions along the A or B chains of natural human insulin, which increase the potency of the compound or change other properties of the compound. In a preferred embodiment, these insulin analogs are in a monomeric form or take a monomeric form quickly in a human.

If a pharmaceutical formulation is comprised of a hydrophobic component, it may be preferable to at least partially dissolve the hydrophilic component in an organic solvent or cosolvent. Examples of hydrophobic pharmaceutical components useful in the present invention include budesonide, testosterone, progesterone, estrogen, flunisolide, triamcinolone, beclomethasone, betamethasone, dexamethasone, fluticasone, methylprednisolone, prednisone and hydrocortisone, peptide, a retinoid, vitamin D, vitamin E, vitamin K, precursors and derivatives of these vitamins, a prostaglandin, a leukotriene, tetrahydrocannabinol, lung surfactant lipid, an antioxidant, a hydrophobic antibiotic or a chemotherapeutic drug. The hydrophobic component preferably will have a solubility of at least 0.1 mg/ml, and more preferably 0.01 mg/ml to 10 mg/ml, in the organic solvent. Useful organic solvents in the present invention include alcohols, ketones, hydrocarbons, and polar aprotic solvents.

If a hydrophobic solution is used as a solvent for the formulation, then the corresponding second fluid will need properties that allow it to create a stable microjet that results in funnel focusing of the second fluid. Preferably, for the creation of dry particles this would be a gas, although a hydrophilic liquid may also be used. In the preferred embodiment, the second fluid is air.

Alternatively, a hydrophobic particle component can be dissolved in an organic solvent or cosolvent, and this solution suspended in a the hydrophilic solution. The hydrophobic component preferably has a solubility of at least 0.1 mg/ml, more preferably 0.1 mg/ml to 10 mg/ml, in the organic solvent, and the hydrophilic component has a low solubility, preferably below 5 mg/ml, in the organic solvent. Particle size obtained using these solvent systems can range from 50 $\mu$M to 20 nm, but preferably 800 nm to 50 nm.

A surfactant may be added to the organic solvent to aid in the solubility of the particle component. Any surfactant reasonable predicted by one skilled in the art may be used. Examples of surfactants useful in the invention include lecithin, polysorbates, benzalkonium chloride, sorbitan esters, and oleic acid.

Component of the improved composition that is a pharmaceutically acceptable excipient includes any of the standard carbohydrate and amino acid carriers that are known in the art to be useful excipients for inhalation therapy, either alone or in combination. These excipients are generally relatively free flowing particulate solids, do not thicken or polymerize upon contact with water, are toxicologically innocuous when inhaled as a dispersed powder and do not, significantly interact with the active agent in a manner that adversely affects the desired physiological action of the agent. Carbohydrate excipients that are particularly useful in this regard include the mono- and polysaccharides. Representative monosaccharides include carbohydrate excipients such as dextrose (anhydrous and the monohydrate; also referred to as glucose and glucose monohydrate), galactose, mannitol, D-mannose, sorbitol, sorbose and the like. Other carbohydrate excipients, include cyclodextrins such as 2-hydroxypropyl-,O-cyclodextrin.

Suitable amino acid excipients include any of the naturally occurring amino acids that form a powder under standard pharmaceutical processing techniques and include the non-polar (hydrophobic) amino acids and polar (uncharged, positively charged and negatively charged) amino acids. Representative examples of non-polar amino acids include alanine, isoleucine, leucine, methionine, phenylalanine, proline, tryptophan and valine. Representative examples of polar, uncharged amino acids include cystine, glycine, glutamine, serine, threonine, and tyrosine. Representative examples of polar, positively charged amino acids include arginine, histidine and lysine. Representative examples of negatively charged amino acids include aspartic acid and glutamic acid. Of these, glycine is preferred.

The amount of excipient that is useful in the composition of this invention is an amount that serves to uniformly distribute the active agent throughout the composition so that it can be uniformly dispersed when it is to be delivered to a subject in need thereof. It must also serve to dilute the active agent to a concentration at which the active agent can provide the desired beneficial palliative or curative results while at the same time minimizing any adverse side effects that might occur from too high a concentration. Thus, for an active agent that has high physiological activity, more of the excipient will be employed. On the other hand, for an active agent that exhibits a lower physiological activity a lesser quantity of the excipient will be employed. In general, the amount of excipient in the composition will be between about 50% weight (w) and 99.9% w. of the total composition, but because the active agent used in the composition of this invention generally have a high physiological activity, the amount of excipient will be between about 95–99.9%. For active agents that have a particularly high physiological activity, the amount of excipient can be as high as between about 98.0% and about 99.9%.

COMPOSITIONS FOR PARTICLE STANDARD FORMULATIONS

The fluids used in producing particle size standards will also depend on the chemical nature of the formulation to be atomized, as described above, but they may also be dependent upon the desired size and nature of the particle to be produced. Standardized particles can be made from any number of materials, including but not limited to polymers, silica, glass, latex, quartz, etc. Generally, smaller particle standards will be created from polymers, whereas materials like silica glass and quartz will be used to create the larger standards. Since the materials used to create standards may be in suspension form rather than solution, the fluid used for presentation of the formulation in the invention may depend more on properties such as speed, pressure, viscosity, etc., rather than hydrophobicity or hydrophilicity of the formulation. Determination of the suitable carriers for the compositions can be made by one skilled in the art.

Water soluble polymers that may be used in the method of the invention, include natural polymers, such as polysaccharides (e.g. acacia, agar, heparin sodium, pectin, sodium alginate, and xanthan gum) and polypeptides (e.g. casein, gelatin, and protamine sulfate). Water soluble polymers for use in the invention may also be synthetic polymers (e.g. polyvinyl alcohol, polyethylene oxide, and povidone).

Standard particles created using the methods of the invention can be used in numerous particle size analysis methods. Such methods include (1) microscopy methods, e.g. optical microscopy, transmission electron microscopy, scanning electron microscopy, atomic force microscopy and imaging analysis; (2) light interaction methods, e.g. laser diffraction, photon correlation spectroscopy, single particle light scattering, multi-angle light scattering, single particle light obscuration, laser doppler velocimetry, and fiber optic doppler anemometry (FODA); (3) electrical property methods, e.g. coulter (electrozone) principle, differential mobility analyzer (DMA), electrophoretic mobility, and zeta potential; (4) sedimentation methods, e.g. photosedimentation, centrifugal sedimentation, and X-ray sedimentation; and (5) sorting and classification methods fluorescence activated cell sorting (FACS), field flow fractionation (FFF), sieving and screening, air classification, and inertial impactors.

Particles created using the methods of the invention can also be used in particle contamination analysis. This includes techniques for: determining particle count, nephelometry & turbidity; filter testing, monitoring cleanroom and workplace air quality, silicon wafer scanner calibration, smoke alarm testing; and cleaning systems evaluation.

Particles created by the methods of the invention can also be used in methods and standards for industry development. This includes precision and accuracy studies, calibration verification, repetitive quality control methods, and validation of definitions and factors.

Particles of the invention can also be used to determine water quality control. Water that can be tested for particulate matter includes water for injection (WFI), municipal drinking water, semiconductor processing water, and water from water filtration systems.

A number of other applications using standard particles also exist, such as fluorescent particle studies, light scattering studies, biomedical and diagnostic materials, flow tracing and fluid mechanics and spacers and components. Also, those skilled in the art will know of other uses of this information.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What is claimed is:

1. A method for producing particles, comprising the steps of:

forcing a first fluid through a channel of a feeding source in a manner which causes the first fluid to be expelled from an exit opening;

forcing a second fluid through a pressure chamber in a manner which causes the second fluid to exit the pressure chamber from an exit orifice in front of a flow path of the first fluid expelled from the exit opening of the feeding source;

forming a stable fluid-fluid interface in a manner which allows the first fluid to form a stable capillary jet focused on the exit orifice of the pressure chamber by the second fluid; and allowing the stable jet of first fluid to exit the pressure chamber and disassociate to produce particles.

2. The method of claim 1, wherein the feeding source is a cylindrical channel and the first fluid is expelled from an exit opening having a diameter in the range of from about 0.002 to about 2 mm and wherein the opening in the pressure chamber has a diameter in the range of about 0.002 to about 2 mm and is positioned directly in front of a flow path of the exit opening of the channel.

3. The method of claim 2, further comprising:

allowing the liquid to evaporate from particles formed.

4. The method of claim 2, wherein the first fluid is a liquid and the second fluid is a gas.

5. The method of claim 4, wherein the liquid has a viscosity in a range of from about $0.3 \times 10^{-3}$ to about $5 \times 10^{-2}$ kg/m/sec, and wherein the liquid is forced through the channel at a rate in a range of about 0.01 nl/sec to about 100 $\mu$l/sec and further wherein the gas is forced through the opening of the pressure chamber at a rate in the range of from about 50 m/sec to about 2000 m/sec.

6. The method of claim 5, wherein the liquid is forced through the channel at a rate in a range of about 1 nl/sec to about 10 $\mu$l/sec and further wherein the gas is forced through the opening of the pressure chamber at a rate in the range of from about 100 to 500 m/sec.

7. The method of claim 4, wherein the liquid has a viscosity in a range of from about $10^{-4}$ to about 1 kg/m/sec and the gas is air.

8. The method of claim 7, wherein the exit opening has a diameter in the range of from about 0.005 mm to about 0.4 mm, and wherein the exit opening of the feeding source is separated by a distance of from about 0.002 to about 2 mm from the exit opening in the pressure chamber.

9. The method of claim 4, wherein gas is forced into an area around the feeding source outlet at a pressure in the range of 10 to 50,000 mBar above atmospheric pressure and further wherein the liquid has a viscosity in the range of from $10^{-4}$ to 1 kg/m/sec.

10. The method of claim 4, wherein gas is forced into an area around the feeding source outlet at a pressure in the range of 100–2000 mBar above atmospheric pressure.

11. The method of claim 4, wherein gas from the pressure chamber surrounds liquid exiting the feeding source outlet which liquid is drawn into the orifice concentrically being focused by the gas flowing out of the outlet, and further wherein the aerosolized particles formed are uniform in size to the extent of having a relative size standard deviation of 3 to 30%.

* * * * *